United States Patent [19]
Koehler

[11] Patent Number: 5,276,500
[45] Date of Patent: Jan. 4, 1994

[54] INTERFEROMETER DEVICE, IN PARTICULAR A STELLAR INTERFEROMETER DEVICE, INCORPORATING A DELAY LINE

[75] Inventor: Bertrand Koehler, Peymeinade, France

[73] Assignee: Societe Nationale Industrielle et Aerospatiale, Paris, France

[21] Appl. No.: 823,745

[22] Filed: Jan. 22, 1992

[30] Foreign Application Priority Data

Jan. 22, 1991 [FR] France ................... 91 00674

[51] Int. Cl.$^5$ ................................ B01B 9/02
[52] U.S. Cl. ..................... 356/346; 356/345; 318/573; 318/574; 318/640; 318/649
[58] Field of Search ............. 356/346, 345; 318/640, 318/573, 574, 649

[56] References Cited

U.S. PATENT DOCUMENTS 5,008,606  4/1991  Koehler et al. ................ 318/649

Primary Examiner—Samuel A. Turner
Assistant Examiner—LaCharles P. Keesee
Attorney, Agent, or Firm—Browdy and Neimark

[57] ABSTRACT

A carriage is moved along a track by a motor connected in a first control loop to a carriage position sensor. The carriage carries a chassis which is coupled to it by a flexible linkage. The chassis carries an accelerometer connected by a second control loop independent of the first control loop to a linear actuator acting on the chassis and bearing on the carriage. The chassis carries a primary mirror fastened to it and a secondary mirror coupled to it by a piezo-electric actuator controlled via a third control loop by an optical path difference OPD error signal generated in the recombination station that includes the interferometer. The third control loop is desaturated by the first or second control loop, preferably by the second control loop. The preferably stellar interferometer may be on board a spacecraft.

7 Claims, 9 Drawing Sheets

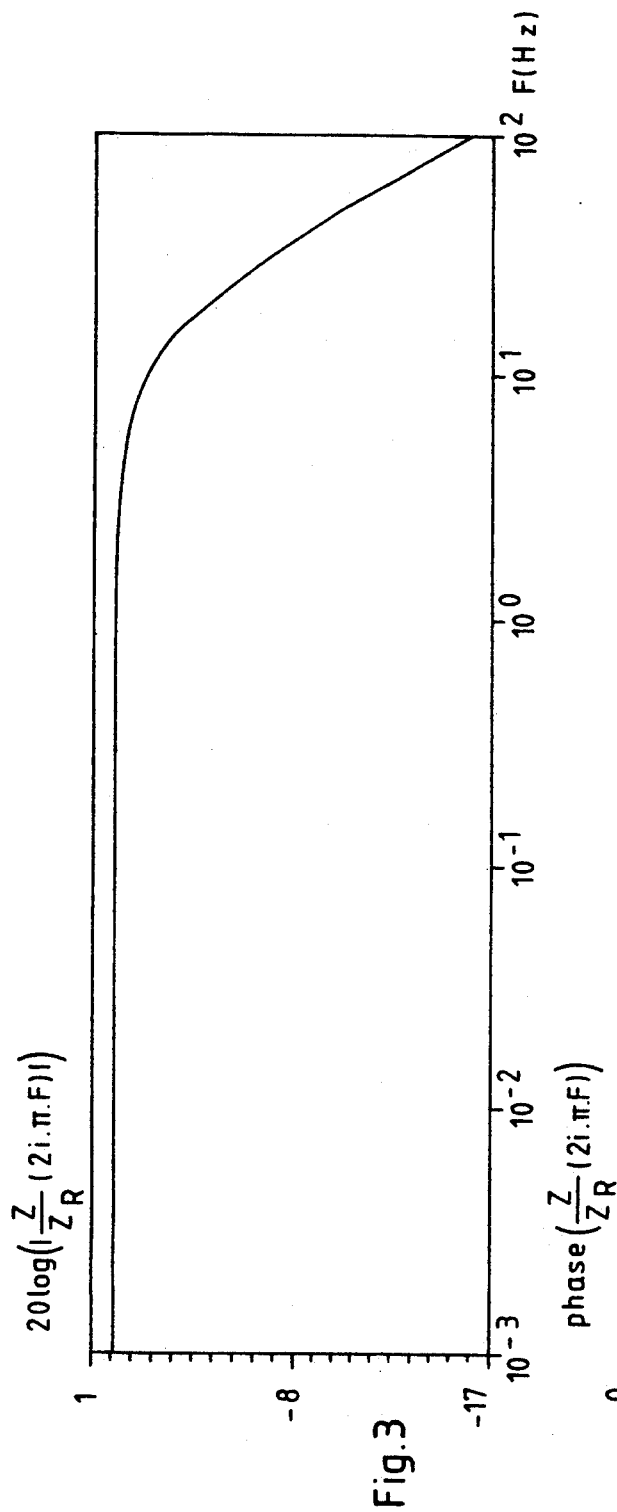
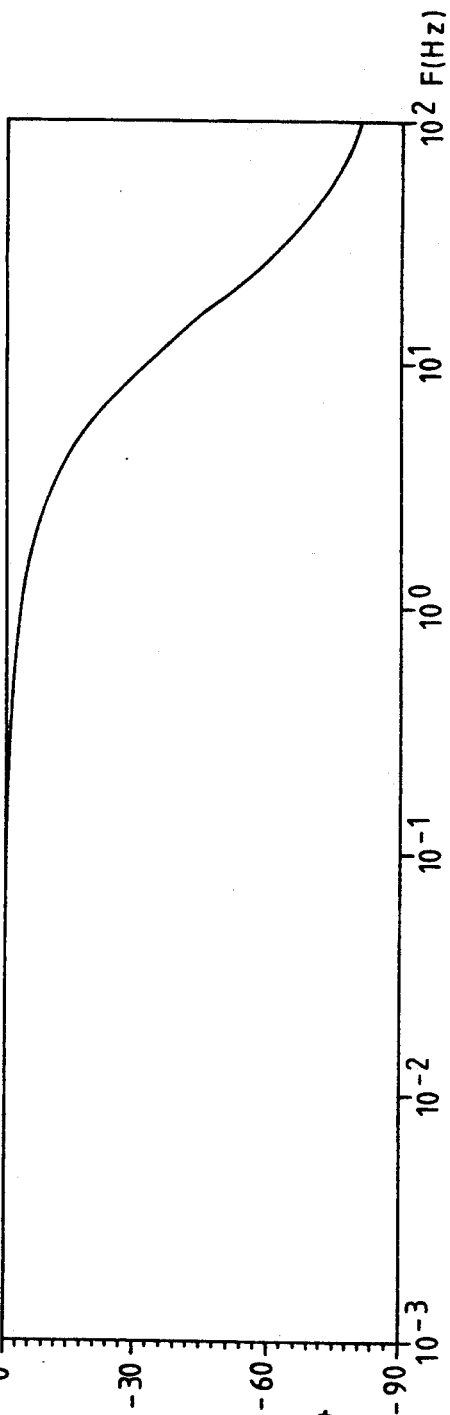

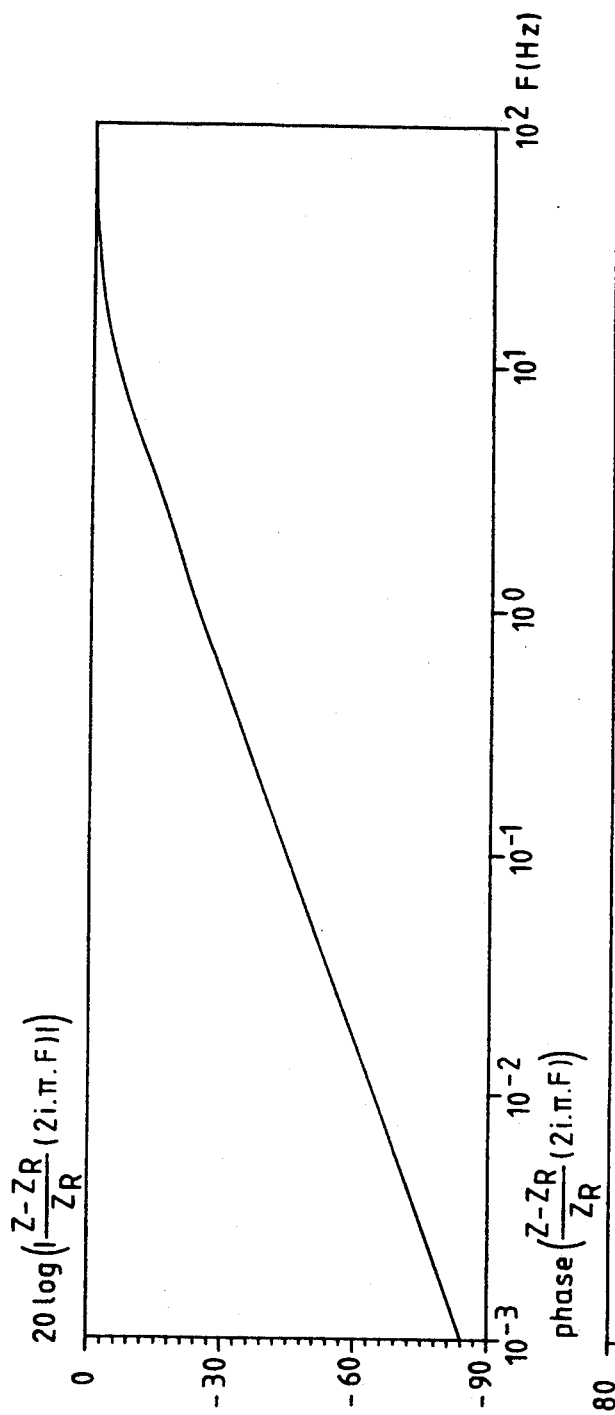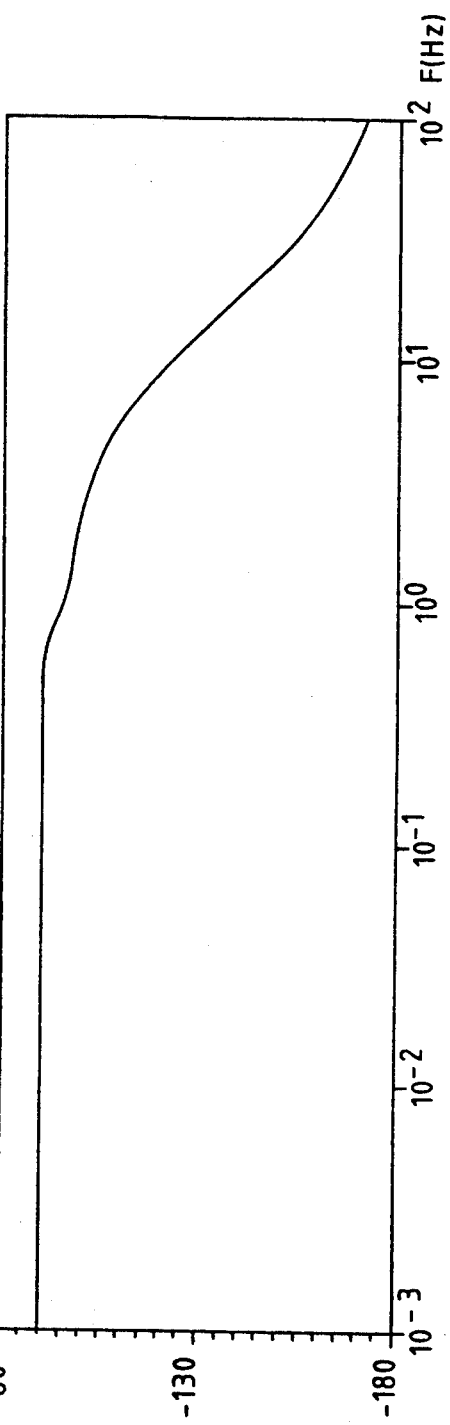
Fig.5
Fig.6

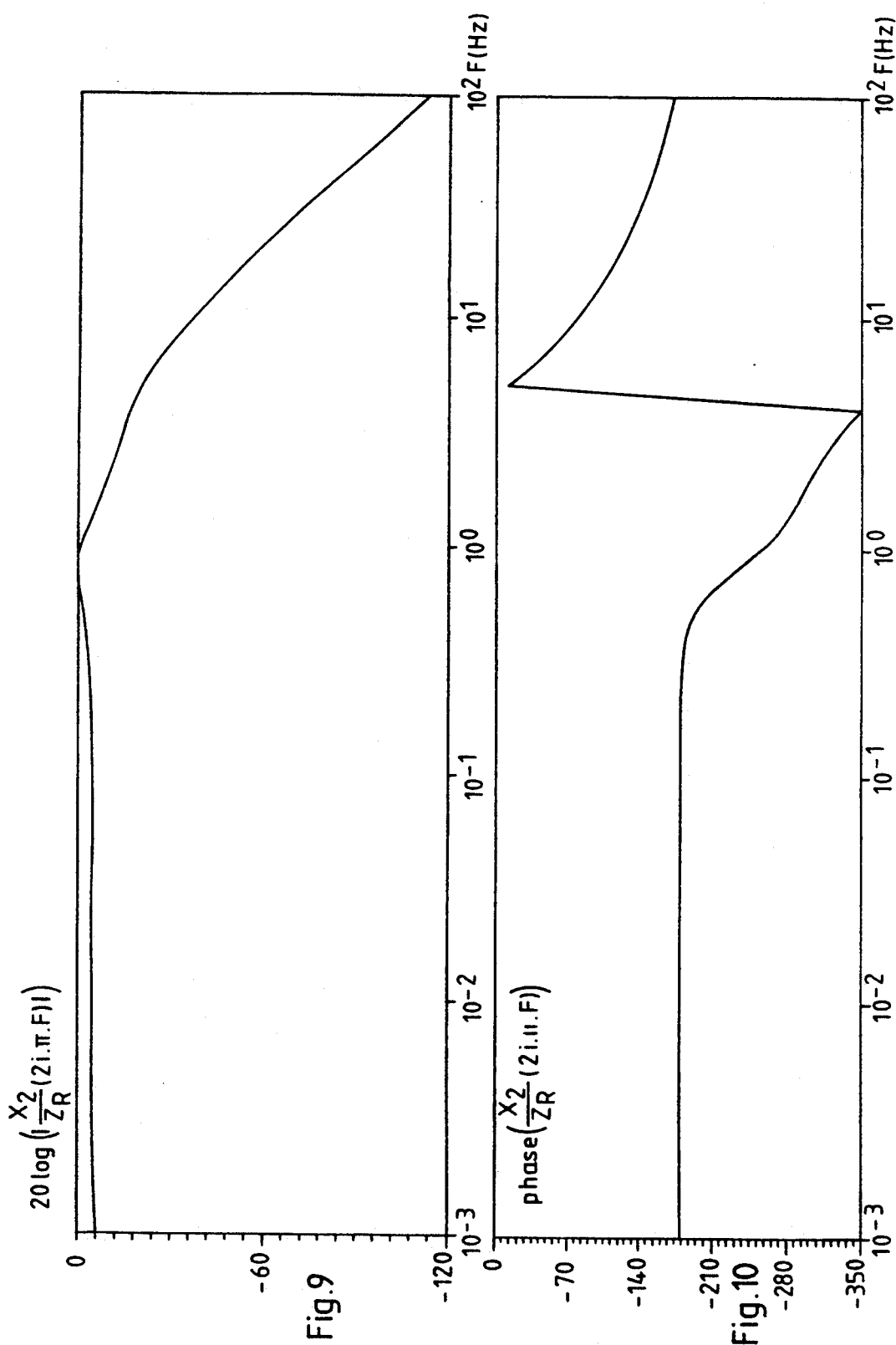

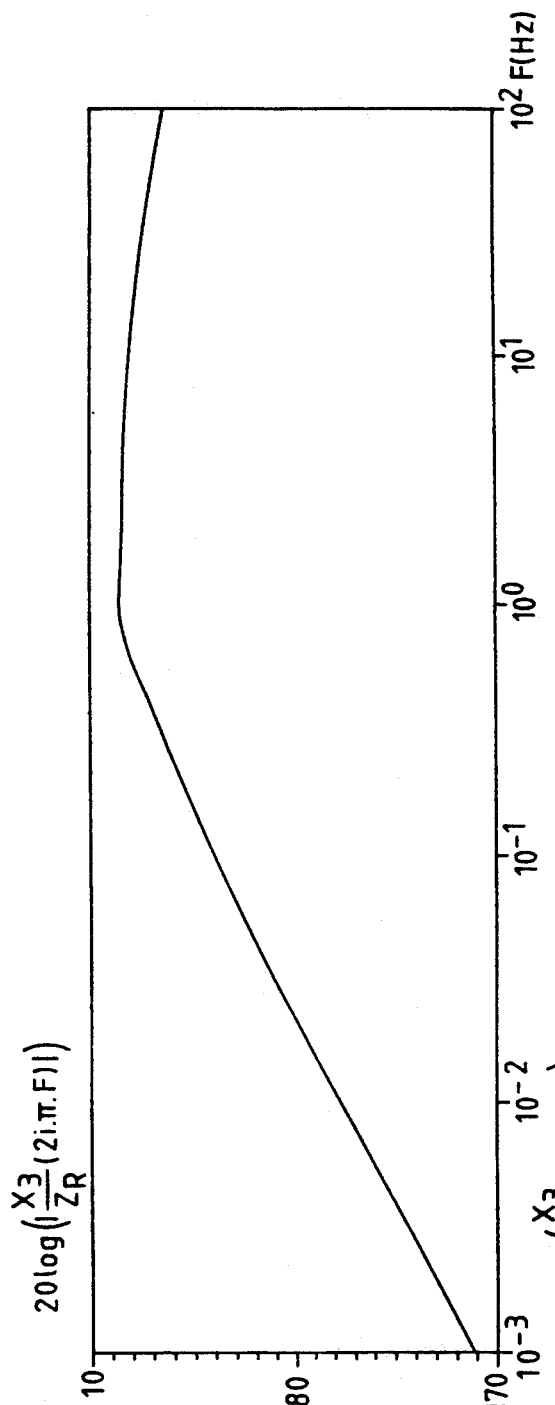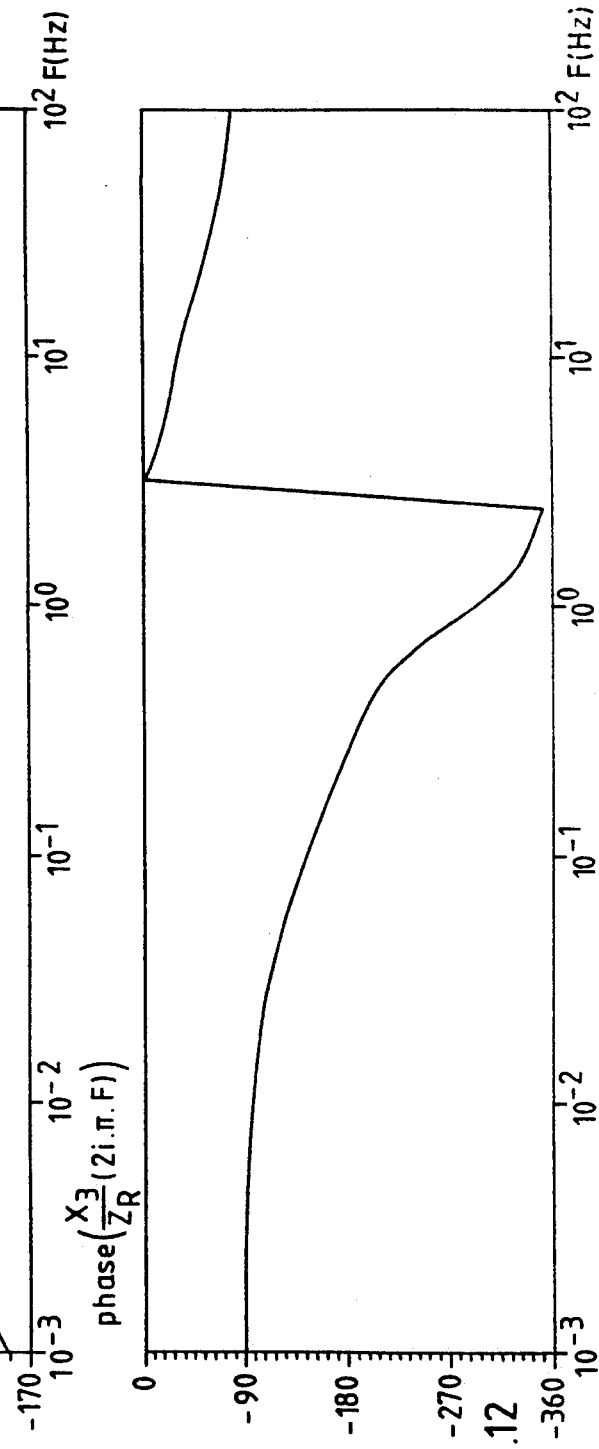

INTERFEROMETER DEVICE, IN PARTICULAR A STELLAR INTERFEROMETER DEVICE, INCORPORATING A DELAY LINE

BACKGROUND OF THE INVENTION

1. Field of the Invention

The present invention concerns the highly accurate control (to within a few nanometers) of movement of an optical component of a cat's eye delay line in a stellar interferometer system. It is more generally concerned with an interferometer device such as a FOURIER TRANSFORM SPECTROMETER in which, in addition to dynamic stabilization of the optical component during programmed movement to eliminate the effect of vibration, disruptive optical path differences generated independently of the optical component and its movement in the remainder of the interferometer device or exterior thereto are compensated.

Programmed vibration-free displacement of this kind is needed, for example, to control an optical delay line within a coherent recombination type stellar interferometer. In this case, where the distance (called the base) between the telescopes is in the order of 100 meters, equalizing the optical paths, despite the rotation of the Earth, requires displacement of the retro-reflector device of the optical delay line over a distance of several meters, at a speed of several tens of millimeters per second, with an average positional accuracy of a few microns and with an instantaneous accuracy (during a setting time of a few hundredths of a second) of a few nanometers (amplitude of the vibrations): the constraints are therefore more severe in respect of the dynamic error than in respect of the static error.

Such displacement characteristics are also necessary if the optical paths are equalized by moving the telescopes themselves.

2. Description of the Prior Art

The 1986 MIT thesis by R. W. HOLM entitled "A High Speed High-Resolution Optical Delay Line for Stellar Interferometry Applications" discloses a device for displacing a "cat's eye" in a delay line comprising a slave carriage moving on rails and comprising a chassis mobile on flexible pivots to which the cat's eye is fixed.

The secondary mirror of the cat's eye is carried by a piezo-electric actuator. The position of the mobile chassis relative to the carriage is controlled by a displacement detector and a loudspeaker voice coil type linear actuator. Finally, the carriage is moved by a stepper motor.

The optical path introduced by the delay line is measured by a laser interferometer. The error signal is injected into the control loop of the piezo-electric actuator. Saturation of this actuator is avoided by the action of the linear actuator and saturation of the linear actuator is avoided by the action of the stepper motor (hence the above use of the term "slave"). There are therefore three control loops nested one within the other.

This displacement device makes it possible to achieve vibration-free displacement of the cat's eye similar to friction-free displacement. It offers good performance because the error signal corresponds directly to the magnitude to be controlled, that is to say to the optical path.

On the other hand, it is ill suited to high speeds because the laser measurement system would then have to have a resolution of a few nanometers while the ratio of the maximum speed of variation of the optical path of the carriage to the resolution is limited by the electronic circuitry for reasons of feasibility.

Also, the piezo-electric actuator cannot apply sufficient force for this device to be applicable to the movement of large masses such as telescopes.

Finally, this device is costly because of the presence of the three control loops and because of the need to have a high-performance laser measurement system which can only function correctly in a vacuum.

A device of this type is described in the publication: P. CONNES 1975 Applied Optics, Volume 14 No 9, p 2067–2084.

The Kachler et al U.S. Pat. No. 5,008,606 describes a device for programmed movement of a carriage carrying via a flexible coupling a payload which must be moved without vibration over a long travel and at high speeds. This device is of the kind used for the delay lines of a stellar interferometer and is free of the drawbacks mentioned above.

This document discloses a vibration-free displacement control device suitable for static and dynamic control of a mobile optical element movable along one direction in an interferometer device comprising a guide track, a carriage carrying a payload including said optical element and movable along said guide track, a motor by which said carriage is driven along said guide track, drive control means connected to said drive motor and adapted to move said carriage according to a predetermined law, flexible linkage means between said payload and said carriage enabling relative movement between said payload and said carriage parallel to said direction of displacement of said optical element, and at least one actuator adapted to act on at least part of the optical element under the control of at least one stabilization control loop connected to at least a second sensor, the device being characterized in that the stabilization control loop is independent of the drive control means, in that the second sensor is an accelerometer carried by the payload and responsive to acceleration of the payload parallel to said direction of displacement of said optical element, in that the actuator acts on all of the payload while bearing on the carriage, in that the stabilization control loop includes filter means for filtering signals from the accelerometer, and in that the drive control means comprises a control loop connected to a position sensor adapted to sense the position of the carriage on the guide track.

In practice the payload is provided with an accelerometer measuring acceleration in the direction of displacement of the carriage and carries a primary element of a linear electromagnetic actuator the secondary element of which is fixed to the carriage and the force applied by the linear motor is controlled by the signal from the accelerometer so that vibrations of the carriage are not transmitted to the payload.

Preferred features of the document included:
- the filter means of the stabilization control loop was a second order filter having a transfer function F(p) of the form:

$$F(p) = \frac{a_2 p^2 + a_1 p + a_0}{p^2 + b_1 p + b_0}$$

- the accelerometer was of the piezo-electric or slaved pendulum type,
- the actuator was of the voice coil type, the guide track used crossed rollers,
the drive motor was a brushless linear motor,
the position sensor was an incremental type sensor,
the drive control loop was a digital position/speed control loop,
the optical element was a "cat's eye" retro-reflector in a delay line,
the optical element was one of the telescopes of a stellar interferometer, mobile towards a recombination station.

This document also proposed a stellar interferometer comprising one or more movement control systems of the aforementioned type.

In practice the novelty of the invention resided notably in the fact that, to damp very effectively vibrations of an optical element mobile along a given path with given kinetic properties, it taught, in a way that went counter to the received wisdom of those skilled in the art, dispensing with any interconnection between the drive and stabilization control systems; surprisingly, the resulting great simplicity (and high reliability) were combined with excellent damping.

This solution enabled very accurate programmed movements of the cat's eye over long distances (up to 100 m) without requiring laser measuring techniques.

An object of the present invention is to improve the teachings of U.S. Pat. No. 5,008,606 by further enabling real time compensation of disturbances due to random and unknown optical path differences generated upstream or downstream of the delay line, possible sources of such disturbances including:

slow drift in pointing in the case of an interferometer device on board a spacecraft, vibrational deformations (at frequencies in the order of 10 Hz, for example) possibly due to flexibility of the spacecraft, atmospheric turbulence in the case of ground observations.

SUMMARY OF THE INVENTION

The invention consists in an interferometer device comprising two optical collectors adapted to be pointed at an object, a recombination station to which said optical collectors are connected optically by two interferometer arms one of which includes a delay line including an optical payload formed by a primary mirror and a secondary mirror and controlled in rectilinear movement in a given direction on a guide track by a device comprising:

a carriage carrying a chassis to which said primary mirror is fastened and which is movable along said guide track, a motor for driving said carriage along said guide track, a first drive motor control loop connected to a position sensor adapted to sense the position of said carriage on said guide track to move said carriage in accordance with a predetermined set point law, flexible linkage members coupling said chassis to said carriage enabling relative movement between said carriage and said chassis parallel to said direction, at least one actuator adapted to bear onto said carriage and act on said chassis under the control of a second control loop independent of said first control loop and connected to a second sensor in the form of an accelerometer carried by said chassis and responsive to acceleration of said chassis parallel to said direction, wherein said secondary mirror is coupled to said chassis by a piezo-electric actuator acting on said secondary mirror parallel to said direction and controlled by a third control loop receiving as input an optical path error signal generated in said recombination station and delivering also to at least one of said first and second control loops an actuator desaturation signal.

The present invention therefore proposes to add to the cat's eye movement control system a third control loop adapted to control the position of the secondary mirror which is now no longer fixed to the payload but subject to the action of a piezo-electric actuator (with a travel in the order of 10 micrometers in practice) using as its input signal the optical path error signal generated in a recombination stage of the interferometer on the basis of the fringes of the object observed or, in a preferred embodiment, of a reference object in the field of observation chosen because of its brightness and/or its previously known luminous characteristics, for example. This piezo-electric actuator is desaturated by at least one of the other two control loops, preferably by the first control loop alone. The desaturation control law is preferably of the proportional-differential type; it may instead be of the proportional-integral type.

The nature of the first and second control loops minimizes the risk of loss of synchronization.

The use of a piezo-electric actuator of this kind had already been proposed by P. CONNES in the aforementioned article, but this was to implement the functions of the first and second control loops of the U.S. Pat. No. 5,008,606. Also, this piezo-electric actuator was controlled on the basis of laser measurements and was desaturated by the second loop which was in turn desaturated by the first (stepper motor) loop. Finally, these first and second loops were nested.

In any event, this known solution had the following drawbacks:

space qualification was problematical because of the laser (service life, reliability, sensitivity to environmental constraints), large travels (>30 meters) were difficult to obtain because of diffusion of the laser light over the reflective surfaces in the cat's eye, the cost of the laser measuring system and of adjusting the three nested loops, the risk of mixing of the laser signal with the stellar signals and therefore of pollution of the stellar astronomic signal.

The present invention also covers an interferometer of the aforementioned type mounted on a spacecraft, in practice a three-axis stabilized spacecraft.

Objects, features and advantages of the invention will emerge from the following description given by way of non-limiting example with reference to the appended drawings.

BRIEF DESCRIPTION OF THE DRAWINGS

FIGS. 3 and 4 show experimentally derived curves of the gain and the phase-shift for the closed loop transfer function $(Z/Z_R)$ of the third loop from FIG. 2 as a function of the frequency of disturbances all assumed to be contained in the optical path $Z_R$.

FIGS. 5 and 6 show experimentally derived curves of the gain and the phase-shift for the rejection curve $(Z-Z_R/Z_R)$ as a function of this frequency.

FIGS. 9 and 10 show similar curves for the transfer function $X_2/Z_R$.

FIGS. 11 and 12 show similar curves for the transfer function $X_3/Z_R$.

DETAILED DESCRIPTION OF THE INVENTION

Figure 1:
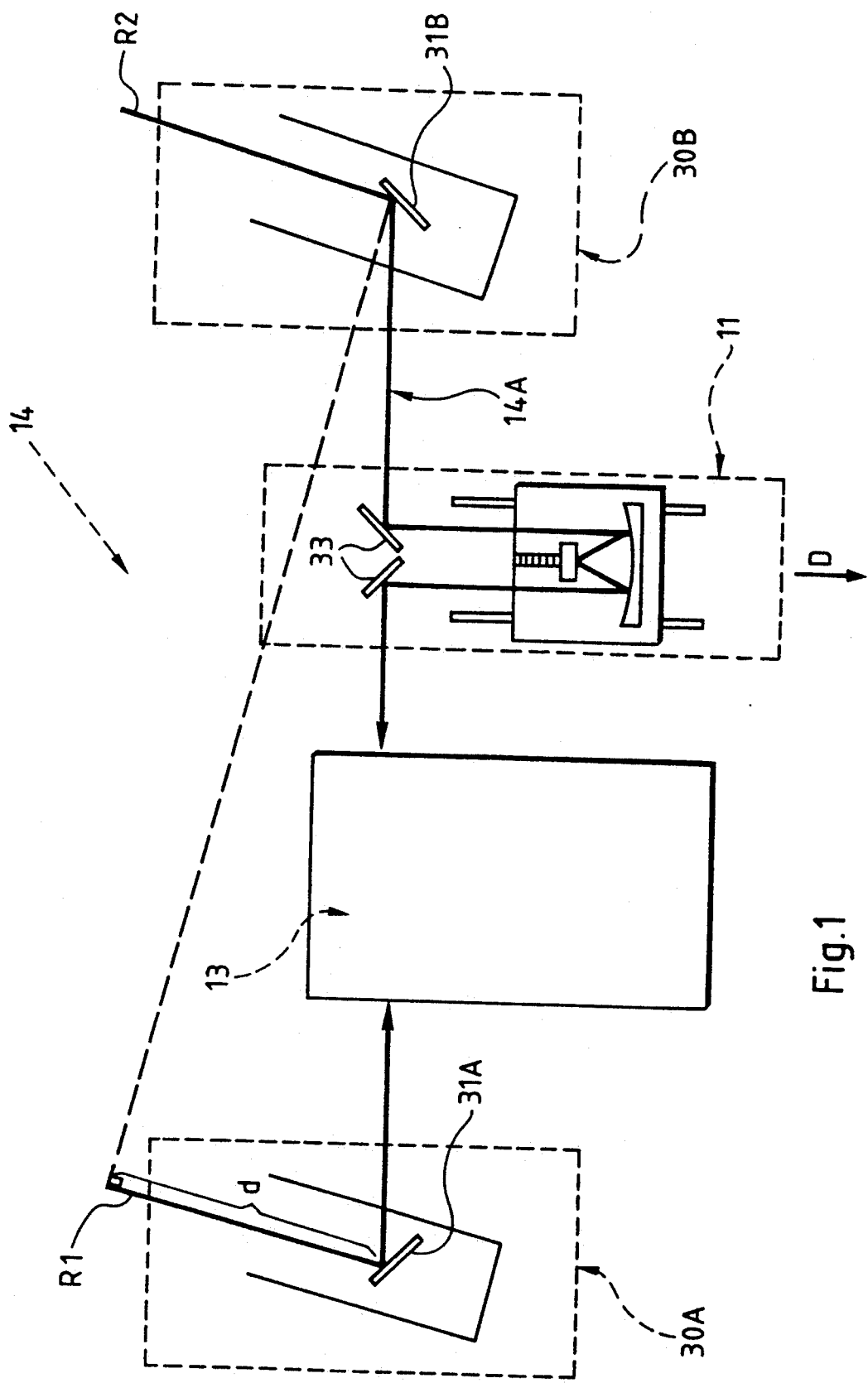
FIG. 1 shows a stellar interferometer system in accordance with the invention.

FIG. 1 shows a stellar interferometer 14 comprising two telescopes 30A and 30B receiving respective rays R1 and R2 from the same heavenly body (not shown). The telescopes comprise mirrors 31A and 31B which reflect the incident radiation to a wave recombination station 13 in which are formed interference fringes characteristic of the radiation emitted by the heavenly body.

The problem is to adjust continuously the optical path in one arm 14A of the stellar interferometer so as to compensate continuously for path differences d related to external disturbing factors and to variations in the position of the object under observation in the sky. FIG. 1 shows the path difference to be compensated. It has the value B.sin z where B is the distance between the telescopes 30A and 30B and z is the zenith angle of the object. The optical path is adjusted by introducing into one arm of the interferometer a so-called "delay line" device 11 consisting of an optical retro-reflector mobile in a direction D.

This solution, described in detail hereafter, has the advantage of being simple to implement and use.

The requirement technical specifications for a delay line device depend essentially on the distance between the telescopes, the angle of the line between the telescopes to the North-South axis, the position in the sky of the objects to be observed, the setting time during which the image of the interference fringes is integrated and the precision required for measuring the fringe contrast. The essential specifications are:

1. The linear travel of the mobile assembly of the delay line (a few meters).
2. The speed of displacement of the retro-reflector (variable between zero and a few tens of millimeters per second).
3. The average precision of the positioning of the mobile assembly, i.e. the retro-reflector (a few micrometers).
4. The dynamic accuracy of the positioning of the retro-reflector relative to its mean position, i.e. the accuracy of optical path difference compensation. This dynamic accuracy is the most critical factor because it conditions the accuracy (a few percent) of the fringe contrast measurement. It is expressed as a mean square position error (a few nanometers) in a time window representing the observation setting time (a few fractions of a second to a few minutes).
5. The amplitude (a few centimeters to a few micrometers, depending on the frequency) and the frequency (up to a few tens of Hertz) of the optical path differences to be corrected by the delay line.

The difficulty is to meet simultaneously specifications 2, 4 and 5 from the above list.

Figure 2A:
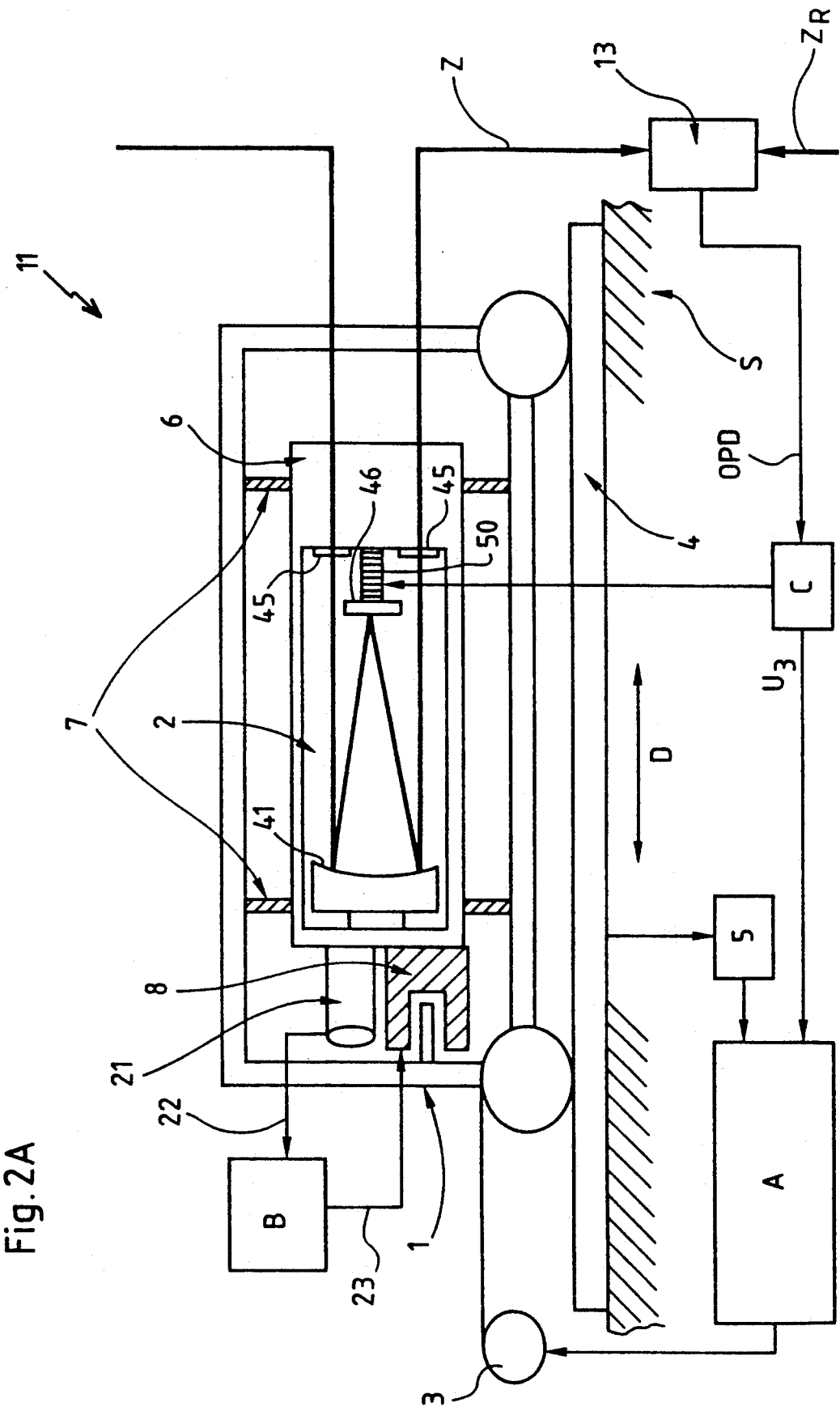
FIG. 2A shows the delay line component displacement control system.

These constraints are met by the device from FIG. 2.

Referring to FIG. 1, note that to make the diagram clearer the direction D has been shown in the same plane as the rays R1 and R2, in other words in a substantially vertical plane. However, this direction is horizontal in practice; to achieve this it is sufficient to orient appropriately the mirrors 33 at the entry to and the exit from the delay line 11. The direction D is preferably, but not necessarily, perpendicular to the common direction of the rays entering and leaving the delay line.

Similarly, although for the most part FIG. 2 represents a view in a vertical plane, the optical path has been shown in this plane for convenience although in practice it is in a horizontal plane.

Like that of U.S. Pat. No. 5,008,606, the delay line 11 comprises in addition to the aforementioned mirrors 33, a displacement control device consisting of a stabilization stage carried by a translation unit.

The translation unit comprises a base S carrying a guide device 4, a mobile carriage 1, a motor 3 and transmission system and a position sensor 5 connected to a control system A (with a power stage) controlling the motor 3 in accordance with output signals from the position sensor and a predetermined set point law.

For cost reasons the translation unit is constructed from commercially available components. Various technologies are available: guidance by rollers on accurately machined rails, by recirculating balls, by friction, by crossed rollers, by air cushions, etc, transmission by belts, by friction roller shaft drives, by recirculating ball precision lead screw and nut systems, etc, drive by DC motors, torque motors, stepper motors, linear motors, etc.

The principal requirement of the device being a low level of vibration in movement, the choice between these various technologies is dictated by the level of vibration generated by each element.

Guidance by rollers on accurately machined rails is a good solution but not one that is generally available "off the shelf". Recirculating ball and friction guidance systems generate vibrations, especially at high speeds. Guidance by cross rollers without recirculation is better than recirculating ball guidance systems, but is ill suited to long travels (more than 1 m). Air cushion guidance can represent an improvement, although instabilities in the air flow can generate significant vibration in the frequency range between 100 and 1 000 Hz.

Belt drives usually give rise to longitudinal vibration generated by the flexibility of the belt. A rod and roller transmission system can be used only for short travels. A lead screw and nut transmission system is ill suited to high-speed displacement and long travels.

A torque motor gives good performance at low speeds and enables direct drive, eliminating vibration generated by a speed reducer. A stepper motor is not suitable because the passage through the successive steps results in longitudinal vibration of the mobile carriage. A linear motor has the advantage of generating a force directly between the base and the mobile carriage, without contact, so eliminating the source of vibration represented by a transmission mechanism.

The solution adopted here is a 1 m travel translation unit comprising a steel base S, a crossed-roller guidance system 4, a fixed permanent magnet brushless linear motor 3, an optical rule type incremental position sensor 5 and a digital position/speed control system. This equipment is manufactured by the American company ANORAD, for example, with the product references ANORIDE 14-40 and IAC-186.

The stabilization stage carried by the carriage 1 includes a flexible linkage 7 linking a chassis 6 to the carriage, a payload 2 fastened to the chassis, an inertial sensor such as an accelerometer 21, a linear actuator 8 and a control loop B. In the context of an optional modification, the stabilization stage may also comprise a second position sensor measuring the position of the payload 2 relative to the carriage 1.

The role of the flexible linkage 7 is to enable relative displacement in the direction D between the carriage 1 and the chassis 6. This linkage may be implemented by two axially offset sets of three flexible blades disposed at 120°. This linkage has the advantage of having no backlash and no friction. The natural frequency of the linkage is around 5 Hz for a combined mass of the chassis and payload of 15 kg. In an alternative embodiment (not shown) the linkage could be just the highest blade from each set, relying on gravity.

The chassis 6 is an "invar" tube (with a diameter of 250 mm, 600 mm long and weighing 3 kg, for example) closed at one end by a plug carrying a primary mirror 41 and at the other end by a closure plate which comprises two circular openings adapted to receive two windows 45 for closing the enclosure formed by the chassis.

The payload 2 is a "cat's eye" type retro-reflector comprising the primary mirror 41, a secondary mirror 46 and the two closure windows 45. This device returns the incident light beam in the opposite direction and is highly insensitive to any lateral and angular movement due to imperfections of the guidance system 4. The closure windows seal the interior of the chassis against ingress of dust to avoid any deterioration in the optical qualities such as would result from a deposit of dust on the mirrors. The primary mirror 41 is a "Zerodur" parabolic mirror with a diameter of 200 mm and a thickness of approximately 20 mm, weighing 3 kg; the secondary mirror 46 is a 10 mm diameter plane mirror; the closure windows 45 are in BK7 glass, 3 mm thick, 80 mm in diameter, with an anti-reflection coating. The primary mirror is coupled to the plug. The secondary mirror and the closure windows are fixed to the plate 42 which closes the chassis 6.

The accelerometer 2 is a sensor which detects acceleration of the chassis at very low levels in a wide band of frequencies. Piezo-electric accelerometers are suitable for this application. The accelerometer used here is a BRUEL and KJAER 8318 with an associated BRUEL and KJAER 2813 amplifier. It is fixed to the center of the rear surface of the plug at the end of the chassis 6.

It weighs 500 g.

The linear actuator 8 is designed to apply a force between the carriage 1 and the chassis 6. This force is determined by the control system B and is used to cancel vibrations of the chassis 6 measured by the sensor 21. The actuator 8 must supply a low level force in a wide band of frequencies. Voice coil type linear actuators as used in loudspeakers are ideally suited to this application. The actuator used here is a PRODERA EX6 and its associated PRODERA 647/30 W amplifier. The body of the actuator is fixed to the carriage 1 and the mobile part including the coil is fixed to the rear surface of the plug at the end of the chassis 6.

The control system B receives the measurement signal 22 from the measurement amplifier associated with the accelerometer 21. It computes from the measurement signal 22 a control signal 23 which is fed to the control amplifier associated with the linear actuator 8. The force delivered by the linear actuator 8 accelerates the chassis 6 in phase opposition to the acceleration measured by the sensor 21, so enabling the amplitude of vibrations of the chassis 6 to be controlled.

The control system B uses a second order filter:

$$\frac{\text{control signal}}{\text{measurement signal}} (p) = \frac{a_2 p^2 + a_1 p + a_0}{p^2 + b_1 p + b_0}$$

in which $p = jw$ is the Laplace variable.

This filter is easy to set up using a Kalman filter type formulation. It is equivalent to feedback of the filtered acceleration and the integral of the filtered acceleration. The filtered acceleration is obtained from the measurement signal 22 by passing it through a first order high-pass filter.

The advantage of the high-pass filter is that it eliminates the effects of any bias on the measurement signal. The advantage of the filtered acceleration feedback is that it enables modification of the natural frequency of the flexible linkage 7 to obtain a closed loop natural frequency suited to the requirements for filtering vibration from the carriage 1. The advantage of the filtered acceleration integral feedback is that it enables generation of a damping term.

This filter is an analog filter.

The Kalman filter type formulation amounts to constructing a payload speed estimator operating on the measured acceleration of the payload. This speed estimate is then taken as the "filtered acceleration integral" term referred to above.

The system as described so far is known from the document EP-0.398.772.

According to the invention, the position of the secondary mirror 46 relative to the chassis 6 is controlled by a piezo-electric actuator 50 operating parallel to the direction D and in the form, for example, of a stack of piezo-electric disks adhesively bonded together between the secondary mirror and the closure plate.

A third control loop C controls the position of the piezo-electric actuator 50 (in practice through a high-voltage amplifier) so as to compensate for the optical path difference OPD sensed by the recombination station 13 which senses the interference fringes (in substance this may comprise the magnitude d from FIG. 1 plus various internal disturbing effects).

The first loop A enables compensation of a maximum variation increase in the magnitude OPD and the speed requirements.

The second loop B, which compensates any vibration generated by the actuator of the first loop, enables the use of costly and highly accurate measuring systems (laser interferometry, for example) to be dispensed with. Laser measuring technology offering high bandwidth and high resolution would be necessary for the closed loop rejection of vibration of the first stage if the second loop were absent. Because of the second loop the measuring system need only comprise a fringe sensing unit in the station 13 adapted to measure OPD at frequencies up to 10 Hz.

The second loop also provides good decoupling of the delay line from potential vibration of the spacecraft in the case of an interferometer carried by a spacecraft.

The third loop C, which compensates the high-frequency components, acts on a very small moving mass, which prevents the occurrence of disturbing forces transmitted to the spacecraft.

Note that it is not possible simply to replace the laser measurement system provided by CONNES in his previously described device with a fringe measuring system because:

1. The fringe error signal is not available during the fringe search phase. However, it is necessary to move the delay line towards the theoretical position at which the fringes should be found with very good accuracy and especially vibrational stability in order to find the fringes quickly and with good contrast. In the P. CONNES system laser measuring technology provides the measure of quality (resolution approximately 5 nm) on which the accurate displacement may be based. Without this technology the stepper motor, the transmission belt and the second stage (which in this case must be controlled in a different way than the "normal" fringe tracking mode) would not offer sufficient performance to generate an accurate and stable displacement using "open loop" control (i.e. without actually measuring the optical path introduced). In the case of the present invention, the benefits of the first two stages (already disclosed in the documents EP-0.398.772) enable accurate and stable movement to be obtained without actual measurement of the optical path introduced. The relatively coarse movement of the first stage is stabilized by the second stage by virtue of the accelerometer loop and without any modification of the control of this second stage relative to the "normal" fringe tracking mode.

Figure 8:
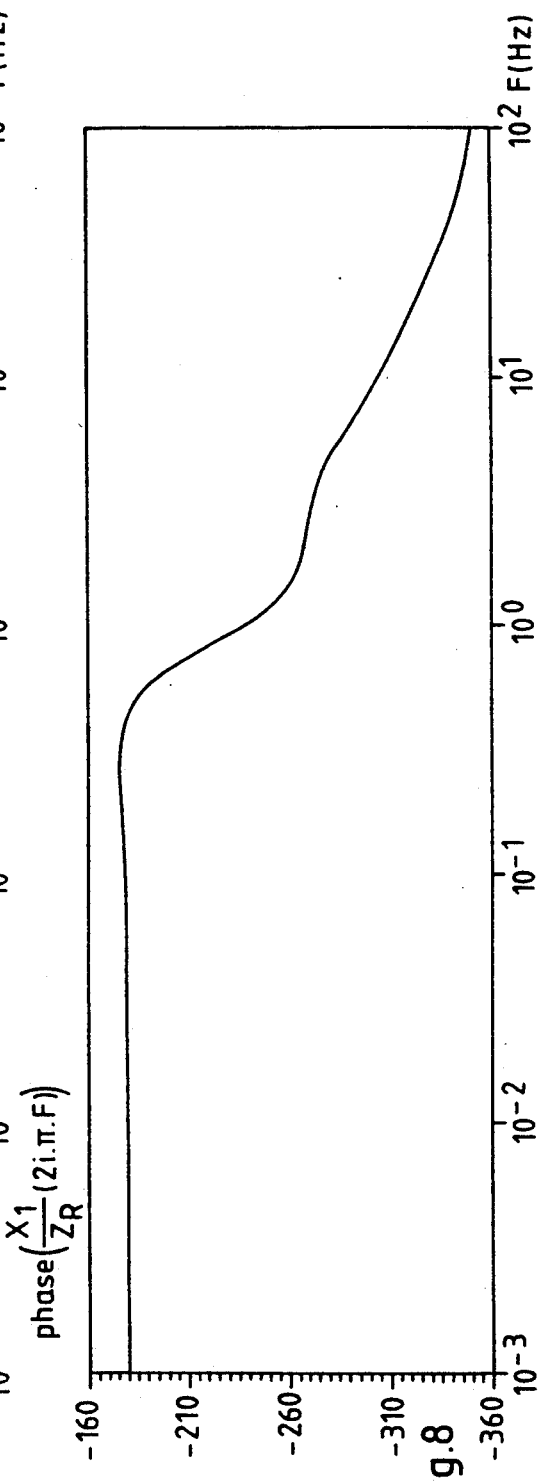

2. In the P. CONNES system the laser is essential during tracking to supply a measurement of adequate bandwidth (>100 Hz) to enable correction (rejection) by the closed loop of the optical path differences generated by the delay line itself (stepping by the stepper motor whose effects, after correction, are still visible and at the limits of the specification, as shown on page 61 and in figure 8.2 of the HOLM thesis: oscillation of the second stage which is not damped by itself, friction between the rolling system and the rails as mentioned on page 64 of the HOLM thesis, etc). In the present case the second stage filters vibrations generated by the first stage and there is therefore no significant optical path difference to be corrected by the tracking closed loop.

Note that the signal applied to the piezo-electric actuator 50 is the optical path difference OPD measured at the fringes with no actual measurement of the actual position of the secondary mirror.

Note that the magnitude OPD is an error signal output by the fringe sensing system in the recombination station. It might be called the "fringe sensing OPD difference error signal", or "fringe phase error signal", or "offset from fringe null OPD signal".

The last of these descriptions is probably the best. This signal is equivalent to a delay line position error.

Various methods have already been proposed for producing this OPD signal. There are two main methods:

1. Modulation of the optical path in one arm of the interferometer and generation of the signal by synchronous demodulation (see, for example, RODDIER F., LENA P., "Long baseline Michelson interferometry with large ground-based telescope operating at optical wavelengths (II)"—Journal of Optics (Paris) Volume 15, No 6, 1984, pp. 363-374).

2. Spectral dispersion of the fringes and generation of the signal by three-dimensional FOURIER transformation (see, for example, VAKILI F., KOECHLIN L., "Aperture synthesis in space:computer fringe blocking"—1989 SPIE, Volume 1130 New Technologies for Astronomy, pp. 109-116).

The OPD magnitude applied as an error signal may represent any object in the field of observation. If a known object is present in this field in addition to an "observed" object to be characterized by analyzing its fringes, the known object is advantageously used as a reference, in other words the OPD magnitude is deduced from analyzing the fringes of this reference object separate from the observed object.

Figure 2B:
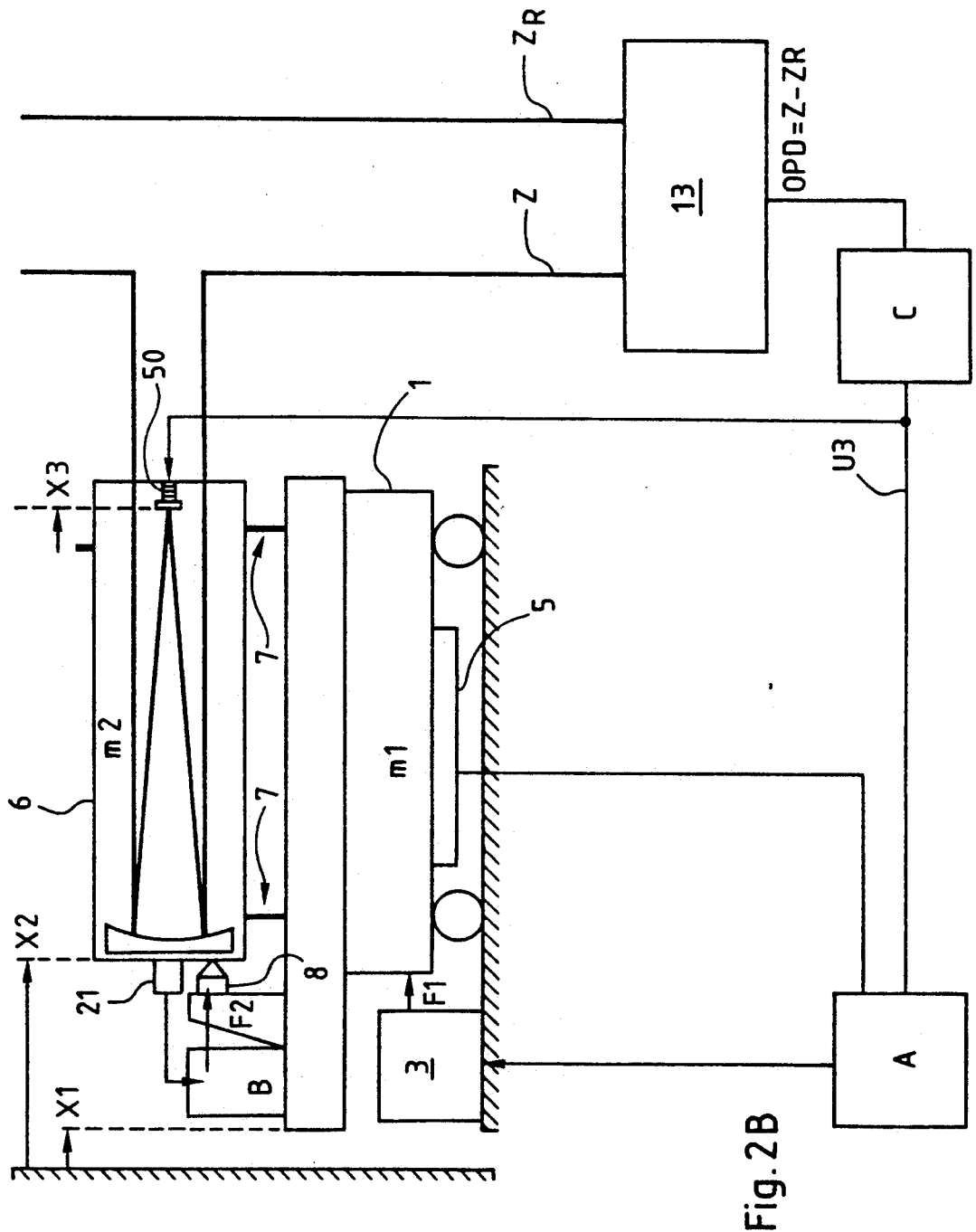
FIG. 2B shows how this system operates.
Figure 7:
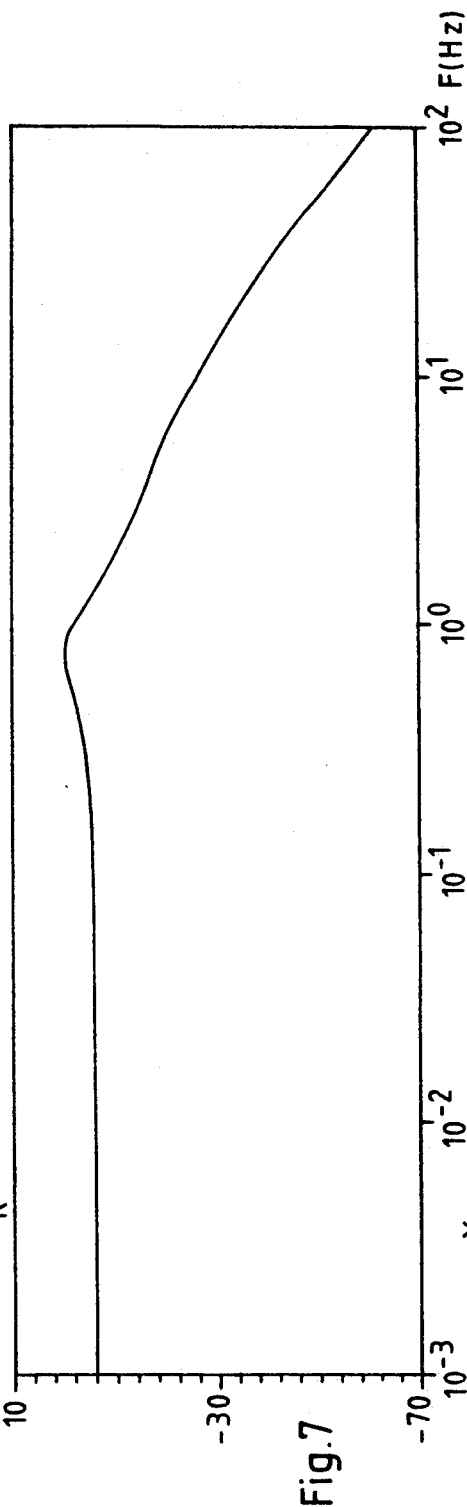
FIGS. 7 and 8 show similar curves for the transfer function $X_1/Z_R$.

FIG. 2B shows the mechanical model from which the control laws are derived.

$$m_1 \frac{d^2 X_1}{dt^2} = F_1 - F_2 - K(X_1 - X_2)$$

$$m_2 \frac{d^2 X_2}{dt^2} = F_2 - K(X_2 - X_1)$$

$$X_3 = K_3 U_3$$

in which $m_1$ is the mass of the carriage 1, $m_2$ is the mass of the chassis 6 and the payload 2, K is the overall stiffness of the flexible linkage 7, $K_3$ is the piezo-electric constant of the piezo-electric actuator 50, $F_1$ is the force applied by the motor 3, $F_2$ is the force applied by the motor 8, $U_3$ is the voltage applied to the piezo-electric actuator 50.

The control principle involves sending the OPD error signal to the piezo-electric actuator 50 via the control loop C in order to compensate for the measured optical path difference OPD. The control voltage $U_3$ is passed to the motor 3 via the control loop A so as to desaturate the piezo-electric actuator 50 whose travel is limited to some 10 micrometers. The accelerometer signal 22 is passed to the linear actuator 8 via the control loop B, which is totally independent of the other two, in order to filter vibration generated by the movement of the carriage 1.

The control laws of the various control systems are derived as follows ($p = 2\pi i f$ is the LAPLACE variable):

control loop A:

$$F_1 = (-C_{10}/p - C_{11} - C_{12} \cdot p) \cdot U_3$$

control loop B:

$$F_2 = (-C_{21}p^2 - C_{22}p)X_2$$

control loop C:

$$U_3 = \frac{1}{2K_3}(-C_{31}(Z - Z_R) - C_{32} p Z)$$

in which the terms $C_{ij}$ are predetermined gain coefficients.

The results obtained with these control laws are shown in FIGS. 3 through 14.

The diagrams show various transfer functions in the form of BODE diagrams. The top curve is the modulus in Decibels (20 log$_{10}$(modulus)) of the transfer function as a function of the frequency (f) of the disturbance $Z_R$ It therefore gives the ratio of the amplitude of the parameter in question to the amplitude of the disturbance $Z_R$. The bottom curve is the phase of the transfer function, that is to say the phase shift between the parameter in question and the disturbance $Z_R$.

FIGS. 3 and 4 show a closed loop bandwidth of 10 Hz. This bandwidth can be increased by adjusting the gain $C_{31}$.

FIGS. 5 and 6 show the closed loop error rejection curve. Note, for example, that a disturbance $Z_R$ at a frequency of 0.1 Hz is corrected with an accuracy of 1%.

FIGS. 7 through 14 show the closed loop behaviour of the various units in relation to the disturbance $Z_R$. For example, for a disturbance $Z_R$ at a frequency of 0.1 Hz the carriage is moved by an amount $X_1$ which is virtually identical to the disturbance $Z_R$ (modulus=0 dB in FIG. 7), the chassis moving $X_2$ (FIGS. 9 and 10) and the piezo-electric actuator moving only $Z_R/100$ (modulus=$-40$ dB in FIG. 11).

At higher frequencies, 10 Hz for example, the same figures show that the carriage and the chassis move very little, most of the disturbance being corrected by the piezo-electric actuator.

Figure 13:
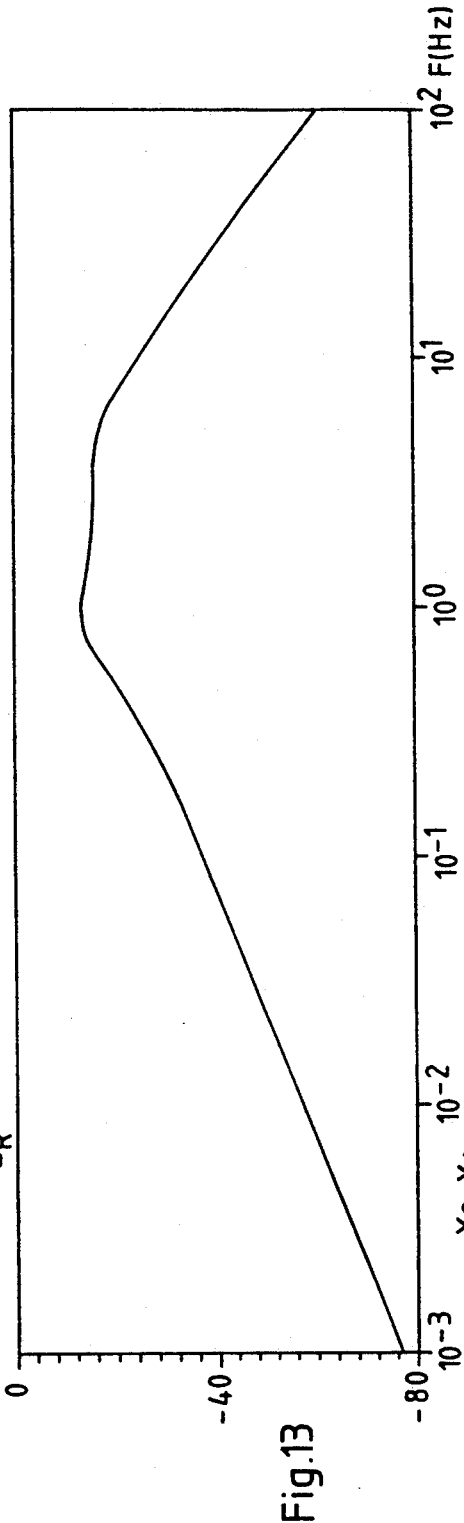
FIGS. 13 and 14 show similar curves for the transfer function $(X_2-X_1)/Z_R$.
Figure 14:
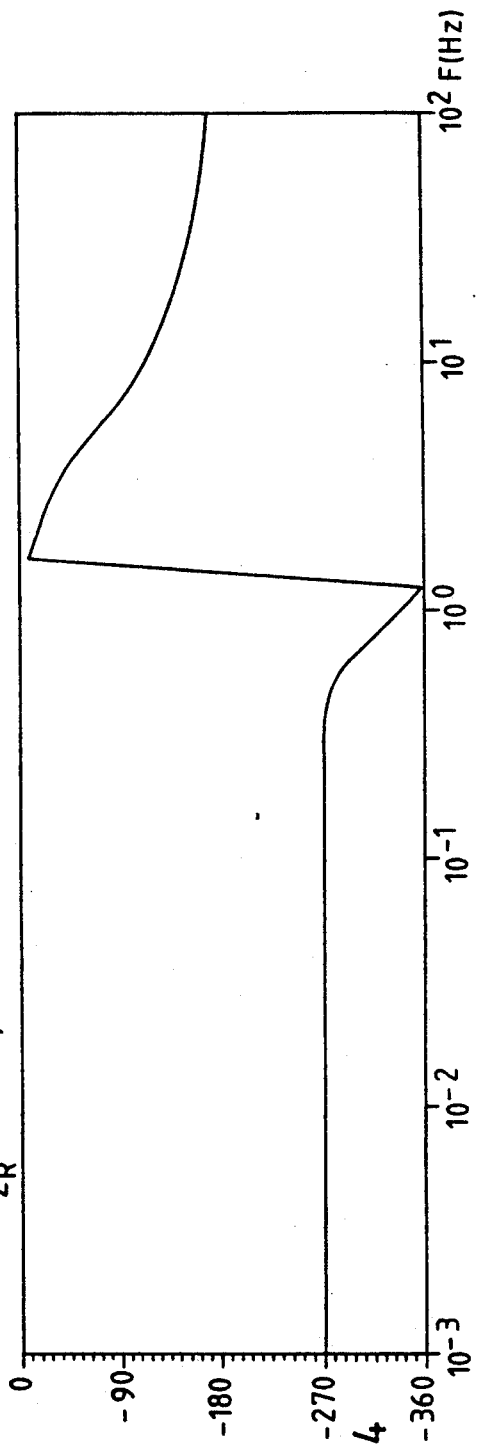

FIGS. 13 and 14 show how the flexible linkage behaves in relation to the disturbance $Z_R$. The transfer function represented is the position of the frame 6 relative to the carriage 1, that is ($X_2-X_1/Z_R$).

For example, a disturbance of 10 μm amplitude at 1 Hz frequency results in the flexible linkage 7 in a relative displacement between the chassis and the carriage of 2.4 μm ($-12$ dB).

It goes without saying that the preceding description has been given by way of non-limiting example only and that numerous variants may be put forward by the man skilled in the art without departing from the scope of the invention.

What is claimed:

1. Interferometer device comprising two optical collectors adapted to be pointed at an object, a recombination station to which said optical connectors are connected optically by two interferometer arms one of which includes a delay line including an optical payload formed by a primary mirror and a secondary mirror and controlled in rectilinear movement in a given direction on a guide track by a device comprising:

a carriage carrying a chassis to which said primary mirror is fastened and which is movable along said guide track, a motor for driving said carriage along said guide track, a first drive motor control loop connected to a position sensor adapted to sense the position of said carriage on said guide track to move said carriage in accordance with a predetermined set point law, flexible linkage members coupling said chassis to said carriage enabling relative movement between said carriage and said chassis parallel to said direction, at least one actuator adapted to bear on said carriage and act on said chassis under the control of a second control loop independent of said first control loop and connected to a second sensor in the form of an accelerometer carried by said chassis and responsive to acceleration of said chassis parallel to said direction, wherein said secondary mirror is coupled to said chassis by a piezo-electric actuator acting on said secondary mirror parallel to said direction and controlled by a third control loop receiving as input an optical path error signal generated in said recombination station and delivering also to at least one of said first and second control loops an actuator desaturation signal.

2. Device according to claim 1 wherein said third control loop is desaturated exclusively by said first control loop.

3. Device according to claim 2 wherein the desaturation control law of said third control loop is of the proportional-differential type.

4. Device according to claim 2 wherein the desaturation control law of said third control loop is of the proportional-integral type.

5. Device according to claim 1 wherein said optical collectors are telescopes in space.

6. Device according to claim 1 carried by a spacecraft.

7. Device according to claim 1 wherein said optical path error signal is determined from fringes of a reference object different from the object to be observed at which the interferometer is aimed but situated in the field of the optical collectors.

* * * * *